(12) United States Patent
Okubo (10) Patent No.: US 12,291,190 B2
(45) Date of Patent: May 6, 2025

(54) VEHICLE TURNING CONTROL DEVICE AND METHOD THEREOF

(71) Applicant: Honda Motor Co., Ltd., Tokyo (JP)

(72) Inventor: Naoto Okubo, Tokyo (JP)

(73) Assignee: Honda Motor Co., Ltd., Tokyo (JP)

( * ) Notice: Subject to any disclaimer, the term of this patent is extended or adjusted under 35 U.S.C. 154(b) by 195 days.

(21) Appl. No.: 18/172,316

(22) Filed: Feb. 22, 2023

(65) Prior Publication Data

US 2023/0311853 A1 Oct. 5, 2023

(30) Foreign Application Priority Data

Mar. 31, 2022 (CN) .......................... 202210331089.4

(51) Int. Cl.
| | |
|---|---|
| *B60W 30/045* | (2012.01) |
| *B60W 40/109* | (2012.01) |
| *B60W 40/114* | (2012.01) |
| *B60W 40/11* | (2012.01) |
| *B60W 40/112* | (2012.01) |

(52) U.S. Cl.
CPC ........ *B60W 30/045* (2013.01); *B60W 40/109* (2013.01); *B60W 40/114* (2013.01); *B60W 40/11* (2013.01); *B60W 40/112* (2013.01); *B60W 2520/125* (2013.01); *B60W 2520/14* (2013.01)

(58) Field of Classification Search
CPC ....... B60W 2520/10; B60W 2520/105; B60W 2520/125; B60W 2520/14; B60W 2520/16; B60W 2520/18; B60W 2540/18; B60W 2720/14; B60W 2720/20; B60W 30/02; B60W 30/045; B60W 40/103; B60W 40/109; B60W 40/11; B60W 40/112; B60W 40/114

See application file for complete search history.

(56) References Cited

U.S. PATENT DOCUMENTS

| | | | | |
|---|---|---|---|---|
| 4,761,022 | A * | 8/1988 | Ohashi | ............... B60G 17/0162 |
| | | | | 280/5.513 |
| 5,627,756 | A * | 5/1997 | Fukada | ................. G05D 1/0891 |
| | | | | 180/197 |

(Continued)

FOREIGN PATENT DOCUMENTS

JP 2011073534 4/2011

*Primary Examiner* — Carl C Staubach
(74) *Attorney, Agent, or Firm* — JCIPRNET (57) ABSTRACT

A vehicle turning control device and a method thereof are disclosed. A saturated rear-wheel lateral offset angle when a rear-wheel lateral force is saturated in turning of a vehicle is obtained from a control state amount and a motion state amount of the vehicle detected. An actual rear-wheel lateral offset angle, and a vehicle body lateral offset angular speed, are calculated from the motion state amount. A first correction amount for correcting a comparison value of the saturated rear-wheel lateral offset angle and the actual rear-wheel lateral offset angle is calculated from speed. A second correction amount for correcting the vehicle body lateral offset angular speed is calculated from the speed and the first correction amount. A target yaw momentum is calculated from the saturated rear-wheel lateral offset angle, the actual rear-wheel lateral offset angle, the comparison value, and the vehicle body lateral offset angular speed.

13 Claims, 5 Drawing Sheets

(56) References Cited

U.S. PATENT DOCUMENTS

| | | | | |
|---|---|---|---|---|
| 8,694,208 B2* | 4/2014 | Yokota | ............... | B60T 8/17554 |
| | | | | 701/41 |
| 8,989,981 B2* | 3/2015 | Yamakado | ........... | B60W 10/119 |
| | | | | 701/72 |
| 9,031,746 B2* | 5/2015 | Kozuka | ................ | B60T 8/1755 |
| | | | | 701/41 |
| 10,759,282 B2* | 9/2020 | Suzuki | ................... | B62D 9/002 |
| 11,718,285 B2* | 8/2023 | Hwang | .............. | B60W 30/045 |
| | | | | 701/41 |
| 11,794,590 B2* | 10/2023 | Hwang | .............. | B60W 10/192 |
| 2007/0112497 A1* | 5/2007 | Miura | .................. | B60T 8/1755 |
| | | | | 701/41 |
| 2007/0265758 A1* | 11/2007 | Miura | .................. | B60W 40/112 |
| | | | | 701/72 |
| 2009/0018742 A1* | 1/2009 | Miura | .................... | B60T 8/322 |
| | | | | 701/72 |
| 2011/0218700 A1* | 9/2011 | Mori | ..................... | B60W 10/06 |
| | | | | 701/31.4 |
| 2012/0179349 A1* | 7/2012 | Yamakado | ......... | B60W 30/045 |
| | | | | 701/89 |
| 2014/0222309 A1* | 8/2014 | Yamakado | ........... | B60W 10/18 |
| | | | | 701/89 |
| 2023/0391317 A1* | 12/2023 | Okubo | ................ | B60W 40/114 |

* cited by examiner

VEHICLE TURNING CONTROL DEVICE AND METHOD THEREOF

CROSS-REFERENCE TO RELATED APPLICATION

This application claims the priority benefit of Chinese application no. 202210331089.4, filed on Mar. 31, 2022. The entirety of the above-mentioned patent application is hereby incorporated by reference herein and made a part of this specification.

BACKGROUND

Technical Field

The disclosure relates to a vehicle turning control device and a method thereof.

Description of Related Art

In recent years, considering the disadvantaged such as the elderly or children among traffic participants, efforts to provide access to a sustainable transport system have been activated. To achieve the above purpose, devotion is made to research and development for further improving traffic safety or convenience through development related to vehicle behavior stability.

When a vehicle is turning or interfered with, it is necessary to control the posture of the vehicle body so that the vehicle runs stably. The current technology is to calculate a target yaw momentum based on deviation of a target rear-wheel lateral offset angle from an estimated rear-wheel offset angle.

In turning, taking the angle at which a rear-wheel lateral force is substantially saturated as a critical value, when a target yaw momentum that is proportional to a difference between the critical value and the rear-wheel lateral offset angle is assigned, the rear-wheel lateral offset angle may increase and decrease repeatedly, which may produce vibration. This may cause difficulty in controlling a driving trajectory by a driver.

In vehicle behavior stability, how to address to vibration response of the rear-wheel lateral offset angle is an issue.

SUMMARY

According to an embodiment of the disclosure, a vehicle turning control device includes: a control state detecting part, a motion state detecting part, a saturated rear-wheel lateral offset angle obtaining part, an actual rear-wheel lateral offset angle calculating part, a vehicle body lateral offset angular speed calculating part, a first correction amount calculating part, a second correction amount calculating part, and a target yaw momentum calculating part. The control state detecting part detects a control state amount of a vehicle. The motion state detecting part detects a motion state amount of the vehicle. The motion state amount includes at least speed and lateral acceleration. The saturated rear-wheel lateral offset angle obtaining part obtains, when a rear-wheel lateral force is saturated in turning of the vehicle, a saturated rear-wheel lateral offset angle as a critical value based on the control state amount and the motion state amount. The actual rear-wheel lateral offset angle calculating part calculates an actual rear-wheel lateral offset angle based on the motion state amount. The vehicle body lateral offset angular speed calculating part calculates a vehicle body lateral offset angular speed based on the motion state amount. The first correction amount calculating part calculates a first correction amount for correcting a comparison value of the saturated rear-wheel lateral offset angle and the actual rear-wheel lateral offset angle based on the speed. The second correction amount calculating part calculates a second correction amount for correcting the vehicle body lateral offset angular speed based on the speed and the first correction amount. The target yaw momentum calculating part calculates a target yaw momentum based on the saturated rear-wheel lateral offset angle, the actual rear-wheel lateral offset angle, the comparison value corrected by the first correction amount, and the vehicle body lateral offset angular speed corrected by the second correction amount.

According to another embodiment of the disclosure, a vehicle turning control method includes the following. A control state amount of a vehicle is detected. A motion state amount of the vehicle is detected. The motion state amount includes at least speed and lateral acceleration. A saturated rear-wheel lateral offset angle when a rear-wheel lateral force is saturated in turning of the vehicle is obtained as a critical value based on the control state amount and the motion state amount. An actual rear-wheel lateral offset angle is calculated based on the motion state amount. A vehicle body lateral offset angular speed is calculated based on the motion state amount. A first correction amount for correcting a comparison value of the saturated rear-wheel lateral offset angle and the actual rear-wheel lateral offset angle is calculated based on the speed. A second correction amount for correcting the vehicle body lateral offset angular speed is calculated based on the speed and the first correction amount. A target yaw momentum is calculated based on the saturated rear-wheel lateral offset angle, the actual rear-wheel lateral offset angle, the comparison value corrected by the first correction amount, and the vehicle body lateral offset angular speed corrected by the second correction amount.

DESCRIPTION OF THE EMBODIMENTS

The disclosure aims to suppress vibration response of a rear-wheel lateral offset angle, contributing to development of a sustainable transport system.

According to an embodiment of the disclosure, a vehicle turning control device includes: a control state detecting part, a motion state detecting part, a saturated rear-wheel lateral offset angle obtaining part, an actual rear-wheel lateral offset angle calculating part, a vehicle body lateral offset angular speed calculating part, a first correction amount calculating part, a second correction amount calculating part, and a target yaw momentum calculating part. The control state detecting part detects a control state amount of a vehicle. The motion state detecting part detects a motion state amount of the vehicle. The motion state amount includes at least speed and lateral acceleration. The saturated rear-wheel lateral offset angle obtaining part obtains, when a rear-wheel lateral force is saturated in turning of the vehicle, a saturated rear-wheel lateral offset angle as a critical value based on the control state amount and the motion state amount. The actual rear-wheel lateral offset angle calculating part calculates an actual rear-wheel lateral offset angle based on the motion state amount. The vehicle body lateral offset angular speed calculating part calculates a vehicle body lateral offset angular speed based on the motion state amount. The first correction amount calculating part calculates a first correction amount for correcting a comparison value of the saturated rear-wheel lateral offset angle and the actual rear-wheel lateral offset angle based on the speed. The second correction amount calculating part calculates a second correction amount for correcting the vehicle body lateral offset angular speed based on the speed and the first correction amount. The target yaw momentum calculating part calculates a target yaw momentum based on the saturated rear-wheel lateral offset angle, the actual rear-wheel lateral offset angle, the comparison value corrected by the first correction amount, and the vehicle body lateral offset angular speed corrected by the second correction amount.

According to an embodiment of the disclosure, in the vehicle turning control device, the target yaw momentum is calculated, in such a manner that the actual rear-wheel lateral offset angle is non-vibrating, based on the comparison value, the vehicle body lateral offset angular speed, the first correction amount, and the second correction amount.

According to an embodiment of the disclosure, in the vehicle turning control device, the first correction amount is set to a first determined value when the speed is less than a first critical value, and the first correction amount is set to a second determined value greater than the first determined value when the speed is equal to or greater than the first critical value. According to an embodiment of the disclosure, in the vehicle turning control device, the first correction amount is set based on the speed and the comparison value. The first correction amount is set to a third determined value when the comparison value is less than a second critical value, and the first correction amount is set to a fourth determined value greater than the third determined value when the comparison value is equal to or greater than the second critical value.

According to an embodiment of the disclosure, in the vehicle turning control device, the second correction amount is set to a first determined value when the speed is less than a first critical value, and the second correction amount is set to a second determined value greater than the first determined value when the speed is equal to or greater than the first critical value. According to an embodiment of the disclosure, in the vehicle turning control device, the first correction amount is set based on the speed and the comparison value. The first correction amount is set to a third determined value when the comparison value is less than a second critical value, and the first correction amount is set to a fourth determined value greater than the third determined value when the comparison value is equal to or greater than the second critical value.

According to an embodiment of the disclosure, in the vehicle turning control device, the motion state amount further includes longitudinal acceleration, vertical acceleration, yaw, roll, and pitch.

According to an embodiment of the disclosure, in the vehicle turning control device, the first correction amount is a proportional gain, and the second correction amount is a vehicle lateral deviation angular speed gain.

According to another embodiment of the disclosure, a vehicle turning control method includes the following. A control state amount of a vehicle is detected. A motion state amount of the vehicle is detected. The motion state amount includes at least speed and lateral acceleration. A saturated rear-wheel lateral offset angle when a rear-wheel lateral force is saturated in turning of the vehicle is obtained as a critical value based on the control state amount and the motion state amount. An actual rear-wheel lateral offset angle is calculated based on the motion state amount. A vehicle body lateral offset angular speed is calculated based on the motion state amount. A first correction amount for correcting a comparison value of the saturated rear-wheel lateral offset angle and the actual rear-wheel lateral offset angle is calculated based on the speed. A second correction amount for correcting the vehicle body lateral offset angular speed is calculated based on the speed and the first correction amount. A target yaw momentum is calculated based on the saturated rear-wheel lateral offset angle, the actual rear-wheel lateral offset angle, the comparison value corrected by the first correction amount, and the vehicle body lateral offset angular speed corrected by the second correction amount.

According to the embodiments of the disclosure, by calculating the target yaw momentum using the first correction amount and the second correction amount calculated based on the speed, vibration response of the rear-wheel lateral offset angle can be suppressed, suppressing difficulty in controlling a driving trajectory by a driver.

Reference will now be made in detail to the exemplary embodiments of the disclosure, examples of which are illustrated in the accompanying drawings. Wherever possible, the same reference numerals are used in the drawings and description to refer to the same or like parts.

Figure 1:
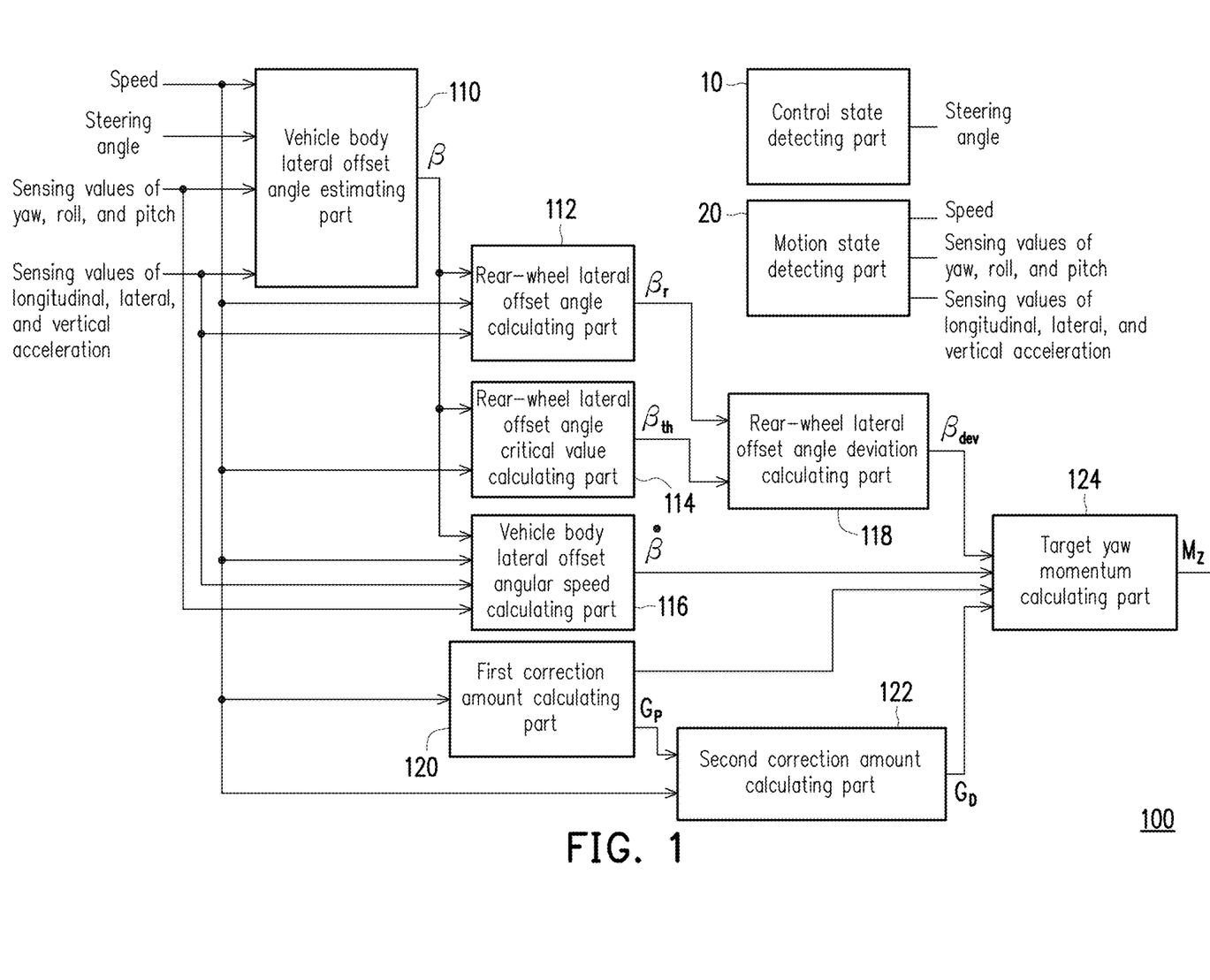
FIG. 1 is a schematic structural diagram showing a vehicle turning control device according to an embodiment of the disclosure.

FIG. 1 is a schematic structural diagram showing a vehicle turning control device according to an embodiment of the disclosure. A vehicle turning control device 100 includes a vehicle body lateral offset angle estimating part 110, a rear-wheel lateral offset angle calculating part 112, a rear-wheel lateral offset angle critical value calculating part 114, a vehicle body lateral offset angular speed calculating part 116, a rear-wheel lateral offset angle deviation calculating part 118, a first correction amount calculating part 120, a second correction amount calculating part 122, and a target yaw momentum calculating part 124. In addition, a vehicle may include an ECU unit, a processor, a memory, or the like, and is configured as to execute the functions of each of the above-mentioned parts.

As shown in FIG. 1, the vehicle may detect a control state amount, such as a steering angle, of the vehicle through a control state detecting part 10. In addition, the vehicle may detect a motion state amount of the vehicle through a motion state detecting part 20. The motion state amount includes at least speed and lateral acceleration. In addition, the motion state amount may also include the sensing values of yaw, roll, and pitch, longitudinal acceleration and vertical acceleration, and the like.

In this embodiment, the vehicle body lateral offset angle estimating part 110 may receive the steering angle as the control state amount and the sensing values of yaw, roll, and pitch, longitudinal acceleration and vertical acceleration, and the like as the motion state amount. The vehicle body lateral offset angle estimating part 110 may generate a vehicle body lateral offset angle through determined operation.

As an actual rear-wheel lateral offset angle calculating part, the rear-wheel lateral offset angle calculating part 112 calculates an actual rear-wheel lateral offset angle βr based on the motion state amount. In this example, the rear-wheel lateral offset angle calculating part 112 receives the vehicle body lateral offset angle output by the vehicle body lateral offset angle estimating part 110, receives the speed and the sensing values of yaw, roll, pitch, and the like, and accordingly calculates the actual rear-wheel lateral offset angle βr.

As a saturated rear-wheel lateral offset angle obtaining part, the rear-wheel lateral offset angle critical value calculating part 114 may calculate, when a rear-wheel lateral force is saturated in turning of the vehicle, a rear-wheel lateral offset angle βth as a critical value βth based on the control state amount and the motion state amount. For example, as shown in FIG. 1, the rear-wheel lateral offset angle critical value calculating part 114 receives the vehicle body lateral offset angle, the speed, and the like, and accordingly calculates the critical value βth.

Moreover, the critical value βth may not only be calculated through the vehicle body lateral offset angle, the speed, and the like, but also be maintained in advance at a value determined by each speed.

The rear-wheel lateral offset angle deviation calculating part 118 receives the actual rear-wheel lateral offset angle βr from the rear-wheel lateral offset angle calculating part 112 and the critical value βth from the rear-wheel lateral offset angle critical value calculating part 114, and accordingly calculates a rear-wheel lateral offset angle deviation value βdev, that is, a comparison value. As an example here, the rear-wheel lateral offset angle deviation value βdev=βr−βth. Also, it may be reflected in the rear-wheel lateral offset angle deviation value βdev only when the rear-wheel lateral offset angle βr is greater than the critical value βth (the difference is positive). If the rear-wheel lateral offset angle βr is less than the critical value βth, the deviation value is zero and no control amount is output.

The vehicle body lateral offset angular speed calculating part 116 calculates a vehicle body lateral offset angular speed $\dot{\beta}$ based on the motion state amount. In this example, the vehicle body lateral offset angular speed calculating part 116 receives the vehicle body lateral offset angle, the speed, the sensing values of yaw, roll, and pitch, the sensing values of longitudinal acceleration, lateral acceleration, and vertical acceleration, and the like, and calculates the vehicle body lateral offset angular speed $\dot{\beta}$.

The first correction amount calculating part 120 calculates a first correction amount Gp based on the speed. The first correction amount Gp is for correcting the comparison value of the rear-wheel lateral offset angle βth and the actual rear-wheel lateral offset angle βr. In this example, the first correction amount Gp may be a proportional gain, and the first correction amount Gp is set through map retrieval. The setting will be further described below. Also, as the first correction amount Gp, the proportional gain is generally calculated as the result obtained through real vehicle testing at present.

The second correction amount calculating part 122 calculates a second correction amount $G_D$ based on the speed and the first correction amount Gp. The second correction amount $G_D$ is for correcting the vehicle body lateral offset angular speed $\dot{\beta}$. In this example, the second correction amount $G_D$ may be a vehicle body lateral offset angular speed gain, and the second correction amount $G_D$ is set through map retrieval. The setting will be further described below.

As the second correction amount $G_D$, the vehicle body lateral offset angular speed gain may be calculated through various parameters of the vehicle, for example, the yaw inertia momentum, the proportional gain, the distance between the center of gravity and the rear axle, the speed, and the like. Calculation thereof is not particularly limited by the disclosure.

The target yaw momentum calculating part 124 calculates a target yaw momentum Mz based on the rear-wheel lateral offset angle βth, the actual rear-wheel lateral offset angle βr, the rear-wheel lateral offset angle deviation value (comparison value) βdev corrected by the first correction amount Gp, and the vehicle body lateral offset angular speed $\dot{\beta}$ corrected by the second correction amount $G_D$.

In this example, the target yaw momentum calculating part 124 receives the rear-wheel lateral offset angle deviation value (comparison value) βdev, the vehicle body lateral offset angular speed $\dot{\beta}$, the first correction amount, and the second correction amount, and generates the target yaw momentum Mz through determined operation. In one example, the target yaw momentum Mz may be calculated by the following Equation (1), but the actual calculation is not limited thereto, and may be adjusted by the designer depending on the actual circumstances.

$$Mz = Gp \cdot \beta dev + GD \cdot \dot{\beta} \quad (1)$$

The generated target yaw momentum Mz is provided to the corresponding components to control the braking force and the driving force of the rear wheels, adjusting the lateral offset of the rear wheels. In this way, by calculating the target yaw momentum Mz using the first correction amount Gp and the second correction amount $G_D$ calculated based on the speed, vibration response of the rear-wheel lateral offset angle βr can be suppressed.

Figure 2:
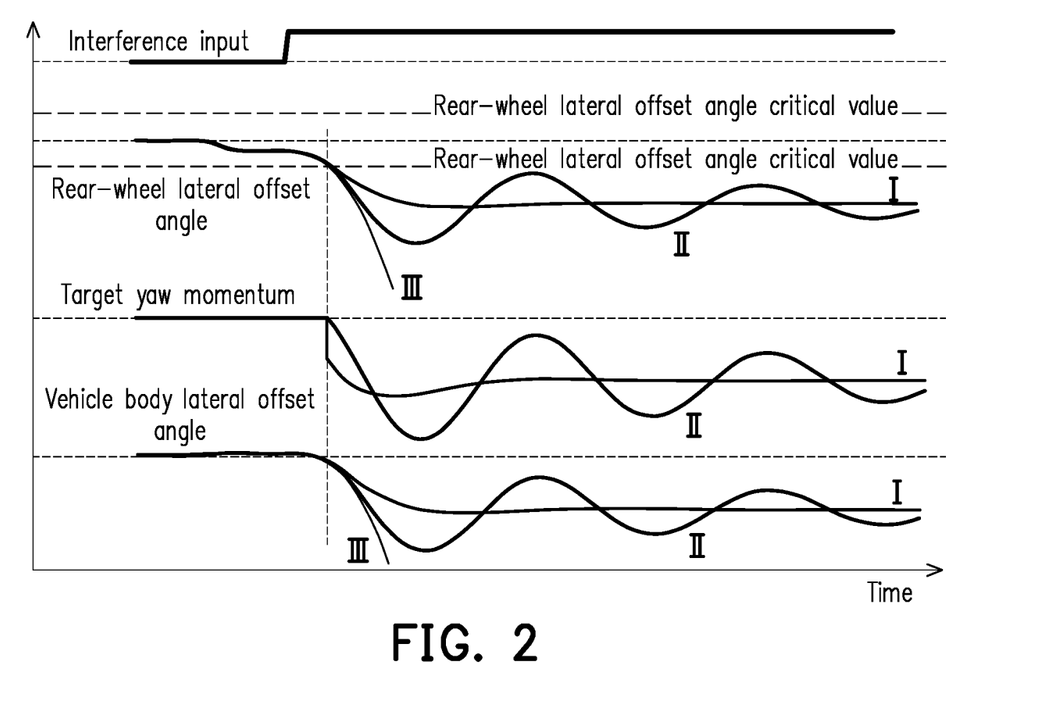
FIG. 2 is a schematic diagram showing a control result according to an embodiment of the disclosure and a conventional control result.

According to an embodiment of the disclosure, the target yaw momentum Mz is calculated, in such a manner that the rear-wheel lateral offset angle βr is non-vibrating, based on the rear-wheel lateral offset angle deviation value (comparison value) βdev, the vehicle body lateral offset angular speed $\dot{\beta}$, the first correction amount Gp, and the second correction amount $G_D$. FIG. 2 is a schematic diagram showing a control result according to an embodiment of the disclosure and a conventional control result. As shown in FIG. 2, among the curves of the rear-wheel lateral offset angle βr, the target yaw momentum Mz, and the vehicle body lateral offset angle, curve I is the result of using the control mode of this embodiment, curve II is the result of using the conventional control mode, and curve III is the result of no control.

In terms of the rear-wheel lateral offset angle βr, it can be seen from curve III that, without any control in turning or after interference occurs, the rear-wheel lateral offset angle βr gradually increases, and may finally lead to slip of the vehicle. Under the conventional control mode, although the rear-wheel lateral offset angle βr may be controlled relatively stably, the change in the rear-wheel lateral offset angle βr presents a vibration response curve. Although serious slip of the vehicle may not occur, the rear-wheel lateral offset angle may constantly sway in running of the vehicle, which may cause difficulty in controlling a driving trajectory by a driver. According to the control mode of this embodiment, it can be clearly seen from curve I that the rear-wheel lateral offset angle βr does not present vibration-mode changes as time increases. In other words, the rear-wheel lateral offset angle βr generally presents a stable and substantially constant state.

Similarly, the same results are shown in terms of the target yaw momentum Mz. In this embodiment, curve I of the calculated target yaw momentum Mz substantially presents a constant value that does not change with time. Lastly, curve I of the vehicle body lateral offset angle also substantially presents a constant value that does not change with time. As a result, according to the control mode of this embodiment, when the vehicle is interfered with or in turning of the vehicle, the traveling direction of the vehicle can be stably controlled without substantial deviation, which can suppress difficulty in controlling a driving trajectory by a driver.

Next, manners of setting the first correction amount Gp and the second correction amount $G_D$ will be described.

Figure 3:
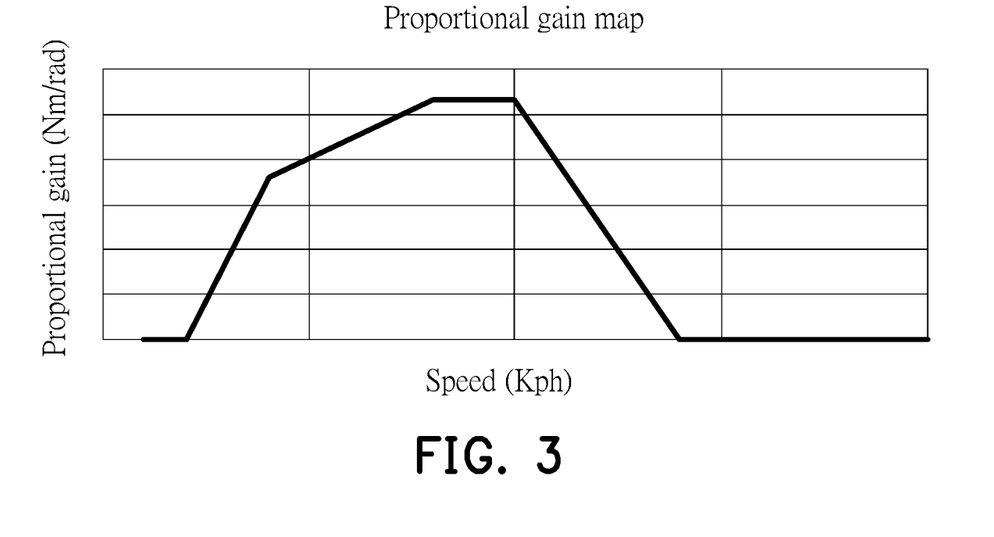
FIG. 3 shows a manner of setting a first correction amount according to an embodiment of the disclosure.

FIG. 3 shows a manner of setting a first correction amount according to an embodiment of the disclosure. FIG. 3 shows a proportional gain map of feedback control of the rear-wheel lateral offset angle βr, where the abscissa is the speed (kph), and the ordinate is the proportional gain (Nm/rad).

As can be seen from the figure, the proportional gain increases as the speed increases. The first correction amount Gp is set by retrieving the appropriate correction amount through this map. According to this embodiment, the speed is compared with a first critical value. When the speed is less than the first critical value, a first determined value is retrieved based on the map in FIG. 3, and the first correction amount Gp is set to the first determined value. In addition, when the speed is equal to or greater than the first critical value, the first correction amount Gp is set to a second determined value greater than the first determined value.

The proportional gain is low at a low speed (e.g., 20 kph or less). The proportional gain is high within the speed range mainly used for control. Moreover, the proportional gain is set to decrease in a direction toward exceeding the upper limit speed for the control, for example, become 0 at 140 kph.

In this way, in this embodiment, the first correction amount Gp may be set as appropriate according to the speed of the vehicle, and the first correction amount Gp may be used to calculate the target yaw momentum Mz. Accordingly, vibration response of the rear-wheel lateral offset angle βr can be suppressed, stabilizing running of the vehicle.

Figure 4:
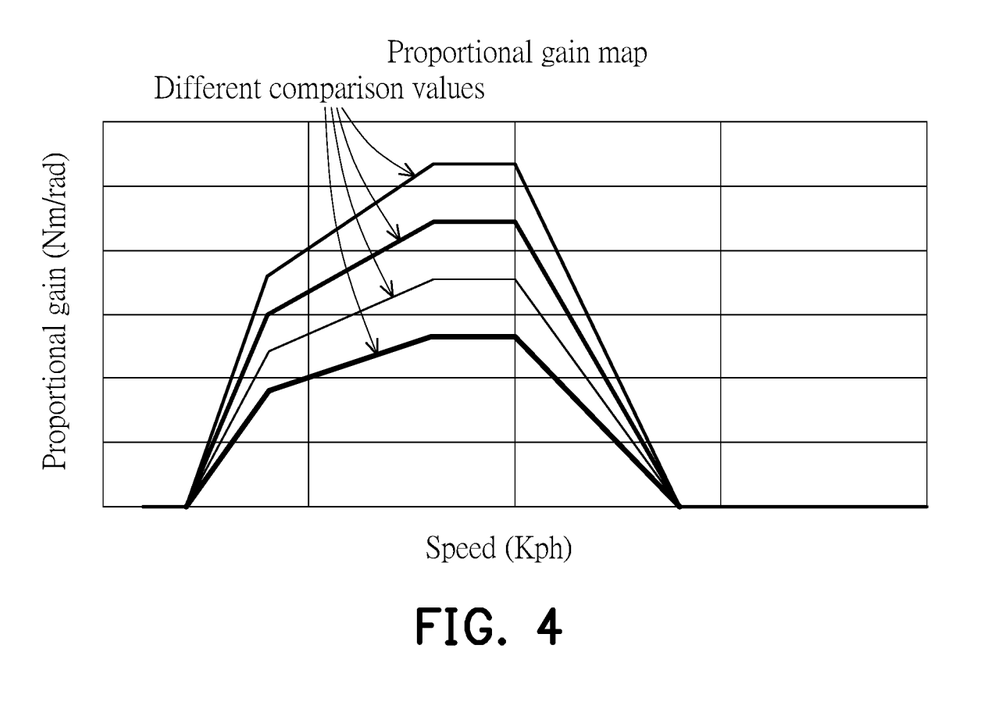
FIG. 4 shows another manner of setting a first correction amount according to an embodiment of the disclosure.

FIG. 4 shows another manner of setting a first correction amount according to an embodiment of the disclosure. The map in FIG. 4 shows curves of multiple comparison values, that is, curves of rear-wheel lateral offset angle deviation values βdev. Similarly, FIG. 4 shows a proportional gain map of feedback control of the rear-wheel lateral offset angle βr, where the abscissa is the speed (kph), and the ordinate is the proportional gain (Nm/rad).

As can be seen from the figure, the proportional gain increases as the speed increases, and the curves differ as the comparison values differ. The first correction amount Gp is set by retrieving the appropriate correction amount through this map. According to this embodiment, the first correction amount Gp is set based on the speed and the rear-wheel lateral offset angle deviation value (comparison value) βdev. In this embodiment, the comparison value may be compared with a second critical value. When the comparison value is less than the second critical value, the first correction amount Gp is set to a third determined value. Also, when the comparison value is equal to or greater than the second critical value, the first correction amount Gp is set to a fourth determined value greater than the third determined value.

Similarly, in this embodiment, the proportional gain is low at a low speed (e.g., 20 kph or less). The proportional gain is high within the speed range mainly used for control. Moreover, the proportional gain is set to decrease in a direction toward exceeding the upper limit speed for the control, for example, become 0 at 140 kph.

In this way, in this embodiment, the first correction amount Gp may be set as appropriate according to the speed of the vehicle and the rear-wheel lateral offset angle deviation value (comparison value) βdev, so that the first correction amount Gp may be set to be relatively appropriate for the current state of the vehicle. Also, by calculating the target yaw momentum Mz using the first correction amount Gp and the second correction amount $G_D$, vibration response of the rear-wheel lateral offset angle βr can be suppressed, stabilizing running of the vehicle.

Figure 5:
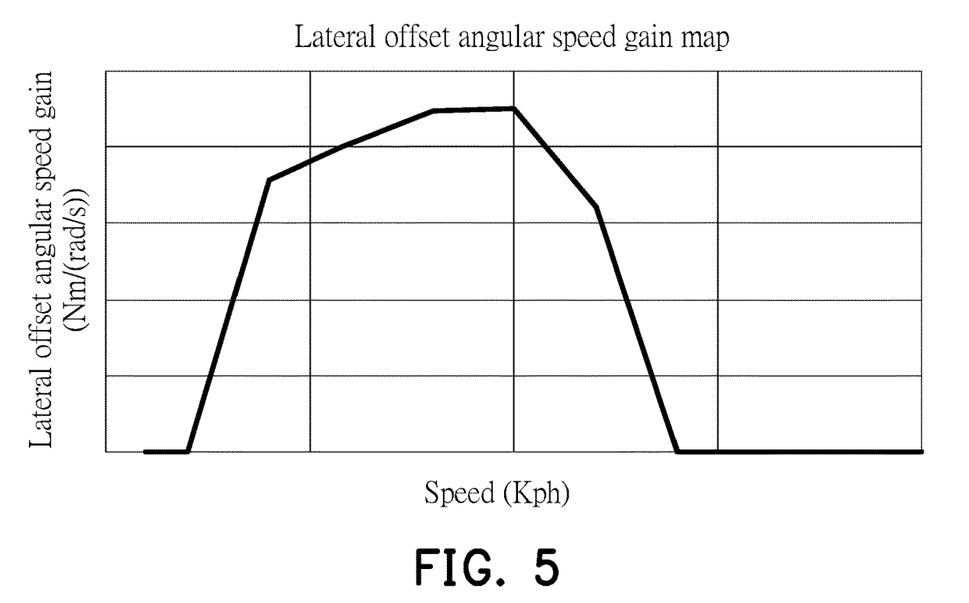
FIG. 5 shows a manner of setting a second correction amount according to an embodiment of the disclosure.

FIG. 5 shows a manner of setting a second correction amount according to an embodiment of the disclosure. FIG. 5 shows a lateral offset angular speed gain map, where the abscissa is the speed (kph), and the ordinate is the lateral offset angular speed gain (Nm/(rad/s)).

As can be seen from the figure, the lateral offset angular speed gain increases as the speed increases. The second correction amount $G_D$ is set by retrieving the appropriate correction amount through this map. According to this embodiment, the speed is compared with a first critical value. When the speed is less than the first critical value, a first determined value is retrieved based on the map in FIG. 5, and the second correction amount $G_D$ is set to the first determined value. In addition, when the speed is equal to or greater than the first critical value, the second correction amount $G_D$ is set to a second determined value greater than the first determined value.

Here, the lateral offset angular speed gain is low at a low speed (e.g., 20 kph or less). The lateral offset angular speed gain is high within the speed range mainly used for control. Moreover, the lateral offset angular speed gain is set to decrease in a direction toward exceeding the upper limit speed for the control, for example, become 0 at 140 kph.

In this way, in this embodiment, the second correction amount $G_D$ may be set as appropriate according to the speed of the vehicle, and the second correction amount $G_D$ and the first correction amount Gp may be used to calculate the target yaw momentum Mz. Accordingly, vibration response of the rear-wheel lateral offset angle βr can be suppressed, stabilizing running of the vehicle.

Figure 6:
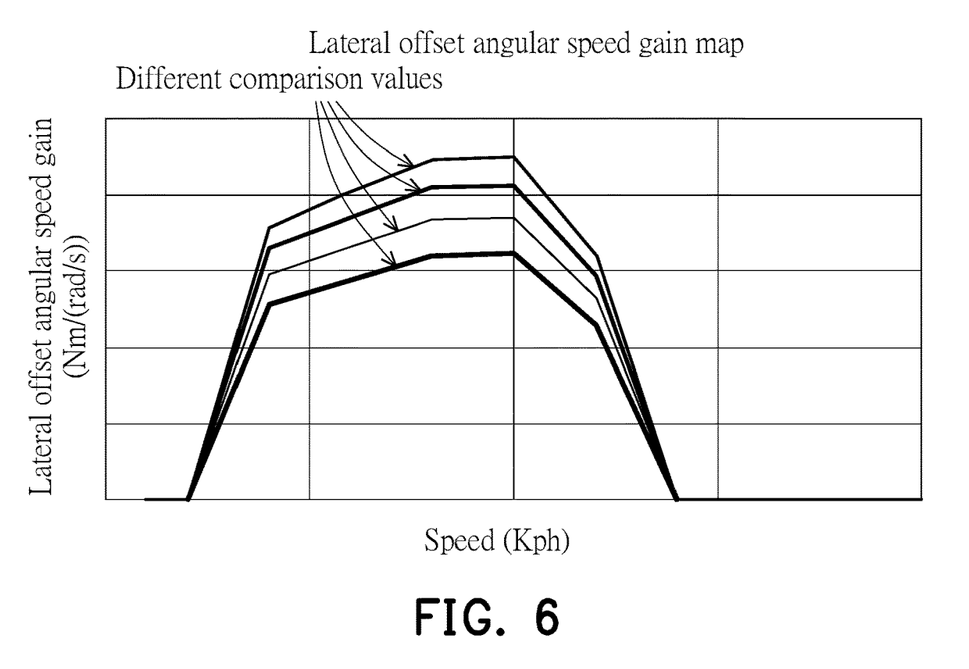
FIG. 6 shows another manner of setting a second correction amount according to an embodiment of the disclosure.

FIG. 6 shows another manner of setting a second correction amount according to an embodiment of the disclosure. The map in FIG. 6 shows curves of multiple comparison values, that is, curves of rear-wheel lateral offset angle deviation values βdev. Similarly, FIG. 6 shows a lateral offset angular speed gain map, where the abscissa is the speed (kph), and the ordinate is the lateral offset angular speed gain (Nm/(rad/s)).

As can be seen from the figure, the lateral offset angular speed gain increases as the speed increases, and the curves differ as the comparison values differ. The second correction amount $G_D$ is set by retrieving the appropriate correction amount through this map. According to this embodiment, the second correction amount $G_D$ is set based on the speed and the rear-wheel lateral offset angle deviation value (comparison value) βdev. In this embodiment, the comparison value may be compared with a second critical value. When the comparison value is less than the second critical value, the second correction amount $G_D$ is set to a third determined value. Also, when the comparison value is equal to or greater than the second critical value, the second correction amount $G_D$ is set to a fourth determined value greater than the third determined value.

Similarly, in this embodiment, the lateral offset angular speed gain is low at a low speed (e.g., 20 kph or less). The lateral offset angular speed gain is high within the speed range mainly used for control. Moreover, the lateral offset angular speed gain is set to decrease in a direction toward exceeding the upper limit speed for the control, for example, become 0 at 140 kph.

In this way, in this embodiment, the second correction amount $G_D$ may be set as appropriate according to the first correction amount Gp, the speed of the vehicle, and the rear-wheel lateral offset angle deviation value (comparison value) βdev, so that the second correction amount $G_D$ may be set to be relatively appropriate for the current state of the vehicle. Also, by calculating the target yaw momentum Mz using the second correction amount $G_D$ and the first correction amount Gp, vibration response of the rear-wheel lateral offset angle βr can be suppressed, stabilizing running of the vehicle.

Figure 7A:
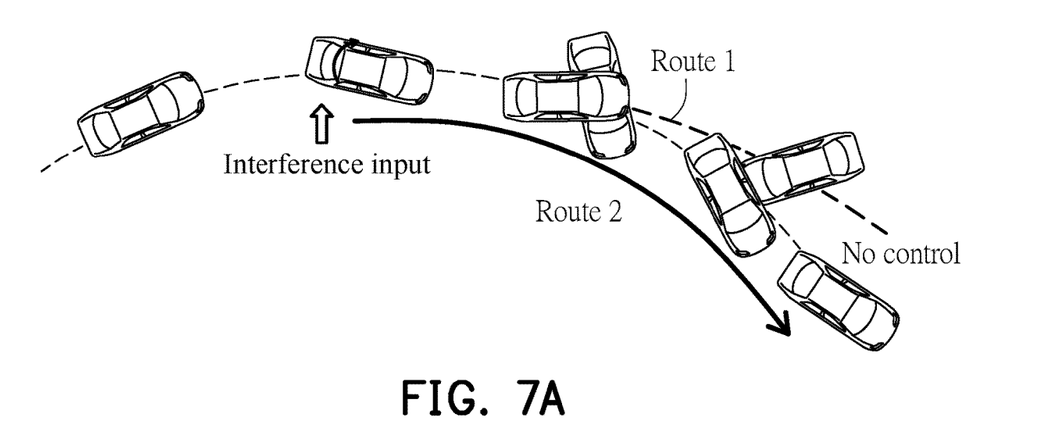
FIG. 7A is a schematic diagram showing results of using a conventional control method.

FIG. 7A is a schematic diagram showing results of using a conventional control method. As shown in FIG. 7A, Route 1 shows a schematic state diagram of vehicle turning without controlling the vehicle V, and Route 2 is a schematic state diagram of vehicle turning the vehicle V being controlled conventionally. Without control, when there is interference input, the vehicle is substantially offset and slips in turning, and cannot drive normally.

In addition, as shown in Route 2, conventionally, the vehicle body of the vehicle V is controlled by adding the yaw momentum proportional to the rear-wheel lateral offset angle. In this way, compared with the case where the vehicle body is not controlled, although the posture of the vehicle body is under control in turning of the vehicle V, vibration may still occur in the rear-wheel lateral offset angle and the vehicle body lateral offset angle of the vehicle V on Route 2 (see the angle change diagram of FIG. 2).

Figure 7B:
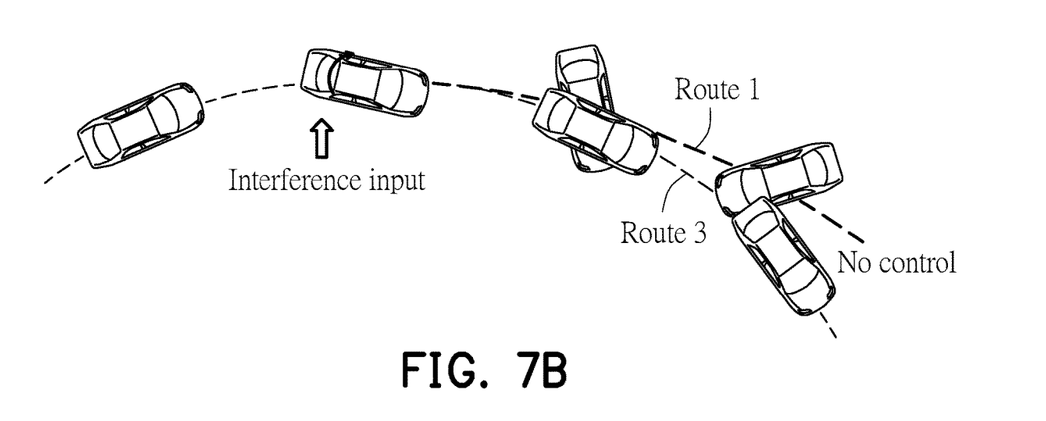
FIG. 7B is a schematic diagram showing results of using a control method according to an embodiment of the disclosure.

FIG. 7B is a schematic diagram showing results of using a control method according to an embodiment of the disclosure. As shown in FIG. 7B, when the control method of the embodiment of the disclosure is adopted, the target yaw momentum Mz is generated through the first correction amount Gp and the second correction amount $G_D$. The target yaw momentum Mz can appropriately control the braking force and the driving force of the rear wheels, stably maintaining the vehicle on the running route without a substantial rear-wheel lateral offset angle. As a result, vibration response of the rear-wheel lateral offset angle can be effectively suppressed, suppressing difficulty in controlling a driving trajectory by a driver.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. A vehicle turning control device, comprising:
   a control state detecting part, detecting a control state amount of a vehicle;
   a motion state detecting part, detecting a motion state amount of the vehicle, wherein the motion state amount comprises at least speed and lateral acceleration;
   a saturated rear-wheel lateral offset angle obtaining part, calculating, when a rear-wheel lateral force is saturated in turning of the vehicle, a saturated rear-wheel lateral offset angle as a critical value based on the control state amount and the motion state amount;
   an actual rear-wheel lateral offset angle calculating part, calculating an actual rear-wheel lateral offset angle based on the motion state amount;
   a vehicle body lateral offset angular speed calculating part, calculating a vehicle body lateral offset angular speed based on the motion state amount;
   a first correction amount calculating part, calculating a first correction amount for correcting a comparison value of the saturated rear-wheel lateral offset angle and the actual rear-wheel lateral offset angle based on the speed;
   a second correction amount calculating part, calculating a second correction amount for correcting the vehicle body lateral offset angular speed based on the speed and the first correction amount; and
   a target yaw momentum calculating part, calculating a target yaw momentum based on the saturated rear-wheel lateral offset angle, the actual rear-wheel lateral offset angle, the comparison value corrected by the first correction amount, and the vehicle body lateral offset angular speed corrected by the second correction amount.

2. The vehicle turning control device according to claim 1, wherein the target yaw momentum is calculated, in such a manner that the actual rear-wheel lateral offset angle is non-vibrating, based on the comparison value, the vehicle body lateral offset angular speed, the first correction amount, and the second correction amount.

3. The vehicle turning control device according to claim 1, wherein the first correction amount is set to a first determined value when the speed is less than a first critical value, and the first correction amount is set to a second determined value greater than the first determined value when the speed is equal to or greater than the first critical value.

4. The vehicle turning control device according to claim 2, wherein the first correction amount is set to a first determined value when the speed is less than a first critical value, and the first correction amount is set to a second determined value greater than the first determined value when the speed is equal to or greater than the first critical value.

5. The vehicle turning control device according to claim 3, wherein the first correction amount is set based on the speed and the comparison value, wherein the first correction amount is set to a third determined value when the comparison value is less than a second critical value, and the first correction amount is set to a fourth determined value greater than the third determined value when the comparison value is equal to or greater than the second critical value.

6. The vehicle turning control device according to claim 4, wherein the first correction amount is set based on the speed and the comparison value, wherein the first correction amount is set to a third determined value when the comparison value is less than a second critical value, and the first correction amount is set to a fourth determined value greater than the third determined value when the comparison value is equal to or greater than the second critical value.

7. The vehicle turning control device according to claim 1, wherein the second correction amount is set to a first determined value when the speed is less than a first critical value, and the second correction amount is set to a second determined value greater than the first determined value when the speed is equal to or greater than the first critical value.

8. The vehicle turning control device according to claim 2, wherein the second correction amount is set to a first determined value when the speed is less than a first critical value, and the second correction amount is set to a second determined value greater than the first determined value when the speed is equal to or greater than the first critical value.

9. The vehicle turning control device according to claim 7, wherein the first correction amount is set based on the speed and the comparison value, wherein the first correction amount is set to a third determined value when the comparison value is less than a second critical value, and the first correction amount is set to a fourth determined value greater than the third determined value when the comparison value is equal to or greater than the second critical value.

10. The vehicle turning control device according to claim 8, wherein the first correction amount is set based on the speed and the comparison value, wherein the first correction amount is set to a third determined value when the comparison value is less than a second critical value, and the first correction amount is set to a fourth determined value greater than the third determined value when the comparison value is equal to or greater than the second critical value.

11. The vehicle turning control device according to claim 1, wherein the motion state amount further comprises longitudinal acceleration, vertical acceleration, yaw, roll, and pitch.

12. The vehicle turning control device according to claim 1, wherein the first correction amount is a proportional gain, and the second correction amount is a vehicle lateral deviation angular speed gain.

13. A vehicle turning control method, comprising:

detecting a control state amount of a vehicle;

detecting a motion state amount of the vehicle, wherein the motion state amount comprises at least speed and lateral acceleration;

obtaining, when a rear-wheel lateral force is saturated in turning of the vehicle, a saturated rear-wheel lateral offset angle as a critical value based on the control state amount and the motion state amount;

calculating an actual rear-wheel lateral offset angle based on the motion state amount;

calculating a vehicle body lateral offset angular speed based on the motion state amount;

calculating a first correction amount for correcting a comparison value of the saturated rear-wheel lateral offset angle and the actual rear-wheel lateral offset angle based on the speed;

calculating a second correction amount for correcting the vehicle body lateral offset angular speed based on the speed and the first correction amount, and increasing the second correction amount for correcting the vehicle body lateral offset angular speed; and calculating a target yaw momentum based on the saturated rear-wheel lateral offset angle, the actual rear-wheel lateral offset angle, the comparison value corrected by the first correction amount, and the vehicle body lateral offset angular speed corrected by the second correction amount.

* * * * *